(12) United States Patent
Cheong (10) Patent No.: US 11,806,721 B2
(45) Date of Patent: Nov. 7, 2023

(54) AUTOMATED SLIDE PREPARING SYSTEM AND METHOD THEREOF

(71) Applicant: Mun Shun Cheong, Perak (MY)

(72) Inventor: Mun Shun Cheong, Perak (MY)

( * ) Notice: Subject to any disclaimer, the term of this patent is extended or adjusted under 35 U.S.C. 154(b) by 0 days.

(21) Appl. No.: 17/933,619

(22) Filed: Sep. 20, 2022

(65) Prior Publication Data
US 2023/0009734 A1   Jan. 12, 2023

Related U.S. Application Data (62) Division of application No. 17/596,765, filed as application No. PCT/MY2021/050057 on Jul. 12, 2021, now Pat. No. 11,717,832.

(30) Foreign Application Priority Data

Jan. 5, 2021 (MY) ............................ PI2021000034

(51) Int. Cl.
*B01L 1/00* (2006.01)
*B01L 9/00* (2006.01)
*B01L 3/00* (2006.01)
*B01L 9/06* (2006.01)

(52) U.S. Cl.
CPC ................. *B01L 9/523* (2013.01); *B01L 3/56* (2013.01); *B01L 9/06* (2013.01); *B01L 2200/025* (2013.01); *B01L 2200/0631* (2013.01); *B01L 2200/18* (2013.01); *B01L 2300/042* (2013.01); *B01L 2300/0681* (2013.01); *B01L 2300/0822* (2013.01)

(58) Field of Classification Search
None
See application file for complete search history.

(56) References Cited

U.S. PATENT DOCUMENTS

| 5,121,752 | A | 6/1992 | Canna |
| 2007/0148041 | A1 | 6/2007 | Hunt et al. |
| 2009/0087904 | A1 | 4/2009 | Heid et al. |
| 2013/0287537 | A1 | 10/2013 | Hecht et al. |
| 2014/0178169 | A1 | 6/2014 | Tebert et al. |

FOREIGN PATENT DOCUMENTS

CN    1967196    5/2007

OTHER PUBLICATIONS

International Search Report and Written Opinion, issued in the corresponding PCT application No. PCT/MY2021/050057, dated Nov. 9, 2021, 11 pages.

*Primary Examiner* — Jyoti Nagpaul
(74) *Attorney, Agent, or Firm* — Hamre, Schumann, Mueller & Larson, P.C.

(57) ABSTRACT

The present invention relates to an apparatus (1) and method (2) for automatically preparing liquid-based cytology (LBC) slides (107) by means of filtration comprising of at least one substrate (101) for holding a vial (103) containing specimen, a filter (105) and a slide (107) wherein said substrate (101) is located at a first station (FS); at least one working station (WS) comprises of a working platform (109) connected to said first station (FS) wherein said first station (FS) includes a vertical rotary conveyor system (121) which is flexible, user friendly and capable of providing uniformity of the cell distribution in the homogenous thin-layer LBC slides (107) as well as increase system throughput.

5 Claims, 8 Drawing Sheets

FIG. 5 (Continuation)

AUTOMATED SLIDE PREPARING SYSTEM AND METHOD THEREOF

1. TECHNICAL FIELD OF THE INVENTION

The present invention relates to an apparatus and method for automatically preparing liquid-based cytology (LBC) slides by means of filtration comprises of at least one substrate for holding a vial containing specimen, a filter and a slide, wherein said substrate is located at a first station; at least one working station; at least one first, second and third pick and place module; whereby said first station includes a vertical rotary conveyor system which comprises of a body frame; at least one actuator which is fixed to said body frame to actuate said vertical rotary conveyor system; at least one movable platform on which said substrate is loaded wherein said movable platform is affixed to said body frame at a predetermined interval; at least one chain guide rail supports by said body frame and guide at least one roller chain; said roller chain connects with at least one sprocket to enable rotation and circulation of said vertical rotary conveyor system driven by the power of said actuator to form an endless track; and at least one alignment means to align said substrate with said movable platform.

2. BACKGROUND OF THE INVENTION

Cervical cancer is a type of cancer that occurs in the cells of the cervix (the lower part uterus that connects to the vagina). It is known as the second most common cause of death from cancer in women. Fortunately, the prevalence of cervical cancer has decreased by more than 50% in the past 30 years, principally due to the introduction of advanced screening with cervical cytology. Papanicolaou (Pap) test and Liquid-based cytology (LBC) are the most common cervical cancer screening.

Pap test or Pap smear is a method or procedure in which a small spatula or brush is applied to gently collect cells from the cervix and the collected cells will be examined under a microscope to look for abnormality. Although Pap test was responsible for the early success in reducing the incidence of cervical cancer, the clinical performance of this method is not within limitations. The Pap test was found to have a false-negative rate of about 14% to 33%, which is mainly caused by the limitations of inadequate sampling of lesions present, whereby only a small portion of sample taken from the patient or incomplete transfer of the sample to a glass slide, poor slide preparation, inaccurate microscopic examination, or the like. As a consequence, in the United States, LBC accounts for more than 90% of the Pap tests as LBC has significantly improved in terms of sample quality, sensitivity, and reproductivity.

It is well known that the new cytopreparatory techniques includes liquid-based cytology (LBC) which is a thin-layer or mono-layer slides preparation technique wherein it involves making a suspension of cells from the sample to produce a thin-layer of cells on a slide. They are mostly applied for cancer screening either gynaecological cancers or non-gynaecological cancers. LBC technique serves as an effective solution to overcome the shortcomings of the conventional Pap smears technique. Unlike the conventional Pap test, the sample is added to a vial of transport medium preservative rather than being spread on a microscope slide. The samples are then processed and deposited in a cell spot onto the slide, subsequent the thin-layer slide is analysed by the cytologist or pathologist. As a consequence of these improvements in sample quality, the clinical sensitivity of LBC over the conventional Pap test in the detection of high-grade lesions has been reported to have increased. Hence, the benefit of LBC compared with the conventional Pap test is evident not only in improvements in technology, but also in the clinical utility for detecting precancerous lesions or cancer.

Canna Cheral J., U.S. Pat. No. 5,121,752 A, disclosed an apparatus and method of obtaining self-administered PAP smears which includes a hollow, cylindrical speculum of suitable minimum inside diameter to permit mirror vision therethrough. The speculum is formed with an angled front orifice wherein the front angle between the orifice and the axis of the speculum is particularly designed to easily fit about the cervix. The entire squamocolumnar junction of the uterine cervix is exposed within the front orifice to permit complete wiping, preferably under visual observation through a hand mirror. A hinged, elongated spatula and an angled endocervical sampler are included as part of the test equipment to facilitate the taking of uncontaminated, accurate specimens. Said invention U.S. Pat. No. 5,121,752 A is a conventional method which encountered several drawbacks such as high false negative rate and false positive rate, whereby this method may not detect cervical cell abnormalities even though they are present, and the test may detect cervical cell abnormalities when there are none. Hence, the limitation is that it does not guarantee accurate results.

In order to overcome the aforementioned limitations of U.S. Pat. No. 5,121,752 A, a simple thin liquid-based cytology method applied for the gynecological examination, the cervical cancer general examination and the cervical cancer preceding lesion of selected crowd, has been disclosed in CN 1967196 B by Qiu Rui Cheng. The steps including: using the cervical cells brush and the scraper to collect samples, put samples in the liquid-based cell preservation solution, add base liquid cell processing solution, oscillate, centrifugally separate, take and discard the supernatant samples liquid, using adding samples gun to assimilate sediment samples, smear, sheet drying, using 95% ethanol marinate or spray for fixed, washing and dyeing. The invention has simple method, small steps, high positive detection rate, low misdiagnosis rate, and it can eliminate the red blood cells, mucus and other interference components from the cervical cytology detection specimens, with good sheet-producing result. In spite of that, CN 1967196 B does not comprise of an automated conveyor system, whereas present invention is capable of automatically preparing the thin-layer LBC slides by way of an automated conveyor system which is efficient, as well as provide uniformity of the cell distribution in the homogenous thin-layer LBC slides.

Hence, it would be advantageous to alleviate the shortcomings by having an apparatus and method for automatically preparing thin-layer or mono-layer liquid-based cytology (LBC) slides by means of filtration with a rotary vertical conveyor system which is highly efficient, flexible and user friendly.

3. SUMMARY OF THE INVENTION

Accordingly, it is the primary aim of the present invention to provide an apparatus and method for automatically preparing liquid-based cytology (LBC) slides by means of filtration whereby said apparatus and method are highly efficient and able to provide uniformity of the cell distribution in the homogenous thin-layer LBC slides.

It is yet another object of the present invention to provide an apparatus and method for automatically preparing LBC slides by means of filtration which aims to maximize space saving.

It is yet another object of the present invention to provide an apparatus and method for automatically preparing LBC slides by means of filtration whereby said apparatus and method are capable of controlling the cellular density.

It is yet another object of the present invention to provide an apparatus and method for automatically preparing LBC slides by means of filtration whereby said apparatus and method aim to reduce obscuring elements such as inflammatory cells, debris, blood and mucus.

It is yet another object of the present invention to provide an apparatus and method for automatically preparing LBC slides by means of filtration whereby said apparatus and method are able to eliminate the air-drying artifacts.

It is yet another object of the present invention to provide an apparatus and method for automatically preparing LBC slides by means of filtration which aims to increase system throughput.

It is yet another object of the present invention to provide an apparatus and method for automatically preparing LBC slides by means of filtration which aims to improve the cells morphology.

It is yet another object of the present invention to provide an apparatus and method for automatically preparing LBC slides by means of filtration which aims to increase system throughput.

It is yet another object of the present invention to provide an apparatus and method for automatically preparing LBC slides by means of filtration which is flexible and user friendly.

It is yet another object of the present invention to provide an apparatus and method for automatically preparing LBC slides by means of filtration which is environmentally friendly.

Other further objects of the invention will become apparent with an understanding of the following detailed description of the invention or upon employment of the invention in practise.

According to the preferred embodiment of the present invention the following is provided:

An apparatus for automatically preparing liquid-based cytology (LBC) slides by means of filtration comprises of:
  at least one substrate for holding a vial containing specimen at a first position, a filter at a second position and a slide at a third position wherein said substrate is located at a first station;
  at least one working station comprises of a working platform connected to said first station;
  at least one first pick and place module to pick said vial from said substrate at said working station, transfer said vial to a second station for untightening and removing a cap of said vial, and subsequently transfer said vial to a first disposable station;
  at least one second pick and place module to pick said filter from said substrate at said working station, immerse said filter into said vial, transfer said filter to adhere to said slide and subsequently transfer said filter to a second disposable station;
  at least one third pick and place module to pick said slide from said substrate at said working station, adhere said slide to said filter, and subsequently transfer said slide to a slide holder;
  characterized in that
  said first station includes a vertical rotary conveyor system comprises of:
    a body frame;
    at least one actuator which is fixed to said body frame to actuate said vertical rotary conveyor system;
    at least one movable platform on which said substrate is loaded wherein said movable platform is affixed to said body frame at a predetermined interval;
    at least one chain guide rail supports by said body frame and guide at least one roller chain;
    said roller chain connects with at least one sprocket to enable rotation and circulation of said vertical rotary conveyor system driven by the power of said actuator to form an endless track; and at least one alignment means to align said substrate with said movable platform.

In another embodiment of the invention there is provided:
A method for automatically preparing liquid-based cytology (LBC) slides by means of filtration, comprising of the following steps:
  (i) placing at least one substrate at a movable platform of a first station wherein said substrate is a means for holding a vial containing specimen, a filter and a slide;
  (ii) conveying said substrate to a working platform of a working station;
  (iii) picking said vial by a first pick and place module to a second station for untightening and removing a cap of said vial;
  (iv) picking and immersing said filter by a second pick and place module into said vial; and
  (v) picking and adhering said slide by a third pick and place module to said filter and transferring said slide to a slide holder afterwards;
characterized in that
said first station includes a vertical rotary conveyor system which perform step (ii) conveying said substrate to a working platform of a working station.

4. BRIEF DESCRIPTION OF THE DRAWINGS

Other aspect of the present invention and their advantages will be discerned after studying the Detailed Description in conjunction with the accompanying drawings in which:

FIG. 1-A shows an exemplary diagram of the present invention with a first station and a working station.

FIG. 1-B shows an exemplary enlarged diagram of the working station.

FIG. 1-C shows an exemplary side view of the first station.

5. DETAILED DESCRIPTION OF THE DRAWINGS

In the following detailed description, numerous specific details are set forth in order to provide a thorough understanding of the invention. However, it will be understood by those with ordinary skill in the art that the invention may be practiced without these specific details. In other instances, well known methods, procedures and/or components have not been described in detail so as not to obscure the invention.

The invention will be more clearly understood from the following description of the embodiments thereof, given by way of example only with reference to the accompanying drawings, which are not drawn to scale.

As used in this disclosure and the appended claims herein, the singular forms "a", "an", and "the" include plural referents unless the context clearly dictates or denotes otherwise.

Throughout the disclosure and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment, "such as" is not used in a restrictive sense, but for explanatory purposes.

Figure 1:
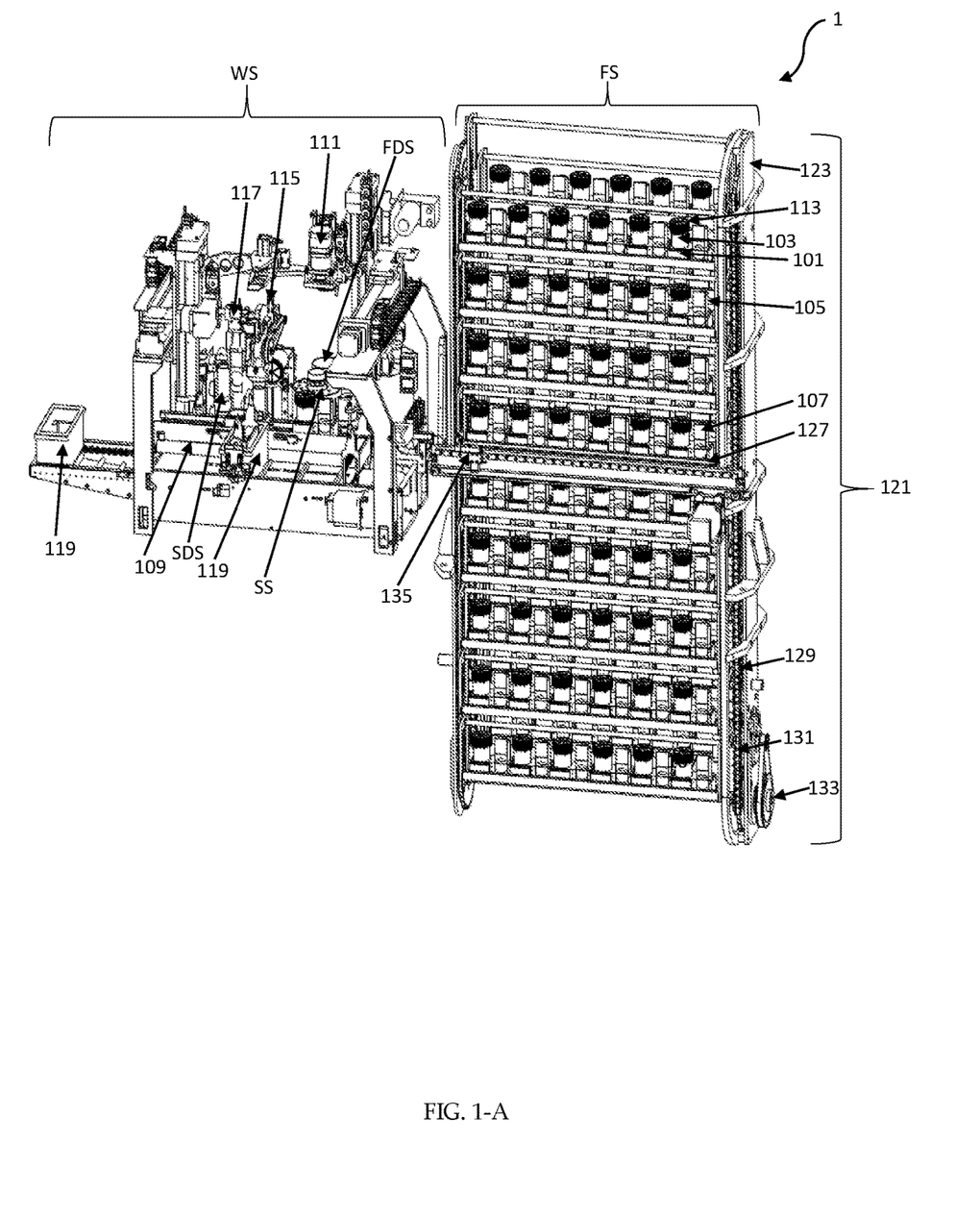

Referring to FIG. 1, present invention is claiming an apparatus (1) for automatically preparing homogenous thin-layer liquid-based cytology (LBC) slides (107) by means of filtration whereby said apparatus (1) comprises of at least one substrate (101) for holding a vial (103) containing specimen at a first position, a filter (105) at a second position and a slide (107) at a third position wherein said substrate (101) is located at a first station (FS). By having said substrate (101), said vial (103), filter (105) and slide (107) are conveyed as a single entity which aim to minimize the mismatch of said vial (103) and slide (107) throughout the process and also to eliminate the idle time during conveying process of said vial (103), filter (105) and slide (107), as make reference to FIG. 4. In addition, said apparatus (1) is having at least one working station (WS) which comprises of a working platform (109) connected to said first station (FS).

As shown in the working station (WS) as illustrated in FIG. 1-A and FIG. 1-B, said apparatus (1) comprises of at least one first pick and place module (111) to pick said vial (103) from said substrate (101) at said working station (WS), transfer said vial (103) to a second station (SS) for untightening and removing a cap (113) of said vial (103), and subsequently transfer said vial (103) to a first disposable station (FDS); at least one second pick and place module (115) to pick said filter (105) from said substrate (101) at said working station (WS), immerse said filter (105) into said vial (103), transfer said filter (105) to adhere to said slide (107) and subsequently transfer said filter (105) to a second disposable station (SDS) wherein said filter (105) is designed to control cells distribution and to standardize thin-layer cytologic smear; at least one third pick and place module (117) to pick said slide (107) from said substrate (101) at said working station (WS), adhere said slide (107) to said filter (105), and subsequently transfer said slide (107) to a slide holder (119). Said first pick and place module (111), second pick and place module (115) and third pick and place module (117) operate automatically without the presence of a user or an operator.

On top of that, said first station (FS) includes a vertical rotary conveyor system (121) comprises of a body frame (123) for supporting and acts as a backbone of said vertical rotary conveyor system (121). Furthermore, at least one actuator (not shown) is fixed to said body frame (123) to actuate said vertical rotary conveyor system (121) wherein said actuator (not shown) includes but not limited to a motor. At least one movable platform (127) on which said substrate (101) is loaded, is affixed to said body frame (123) at a predetermined interval, said movable platform (127) is connected with said working platform (109) to enable continuous movement of said substrate from the first station (FS) to working station (WS). Said substrate (101) is aligned by at least one alignment means (135) to said movable platform (127) wherein said movable platform (127) and working platform (109) includes conveyor belt, pallets or the like.

Said body frame (123) further works as a holder for at least one chain guide rail (129). Said chain guide rail supports and guide at least one roller chain (131) wherein said roller chain (131) connects with at least one sprocket (133) to enable rotation and circulation of said vertical rotary conveyor system (121) driven by the power of said actuator (not shown) to form an endless track. Additionally, said vertical rotary conveyor system (121) is an automated system which enables continuous movement of said substrates in a clockwise or anticlockwise direction. It adopts rotating mechanism so as to minimize the vibration and noise and essentially said vertical rotary conveyor system (121) is having a flexible operation whereby in the absence of one the substrate (101) in any movable platform (127) or there is a need to replace the substrate (101), the user can assuredly insert another set of substrate (101) without making any interference to said apparatus (1). Furthermore, said vertical rotary conveyor system (121) possess the ability to efficiently and promptly added the substrate (101) into the movable platform (127), as make reference to FIG. 1-A and FIG. 1-C.

The existing devices or modules for preparing the LBC slides are not capable of providing the significant effects as stated above, as the current modules do not encompass the novel features of said vertical rotary conveyor system (121). Hence, the present invention is notably new and do involve an inventive step as the existing devices or modules do not provide any teaching, suggestion, or motivation for a person skilled in the art to arrive at the present invention.

Figure 2:
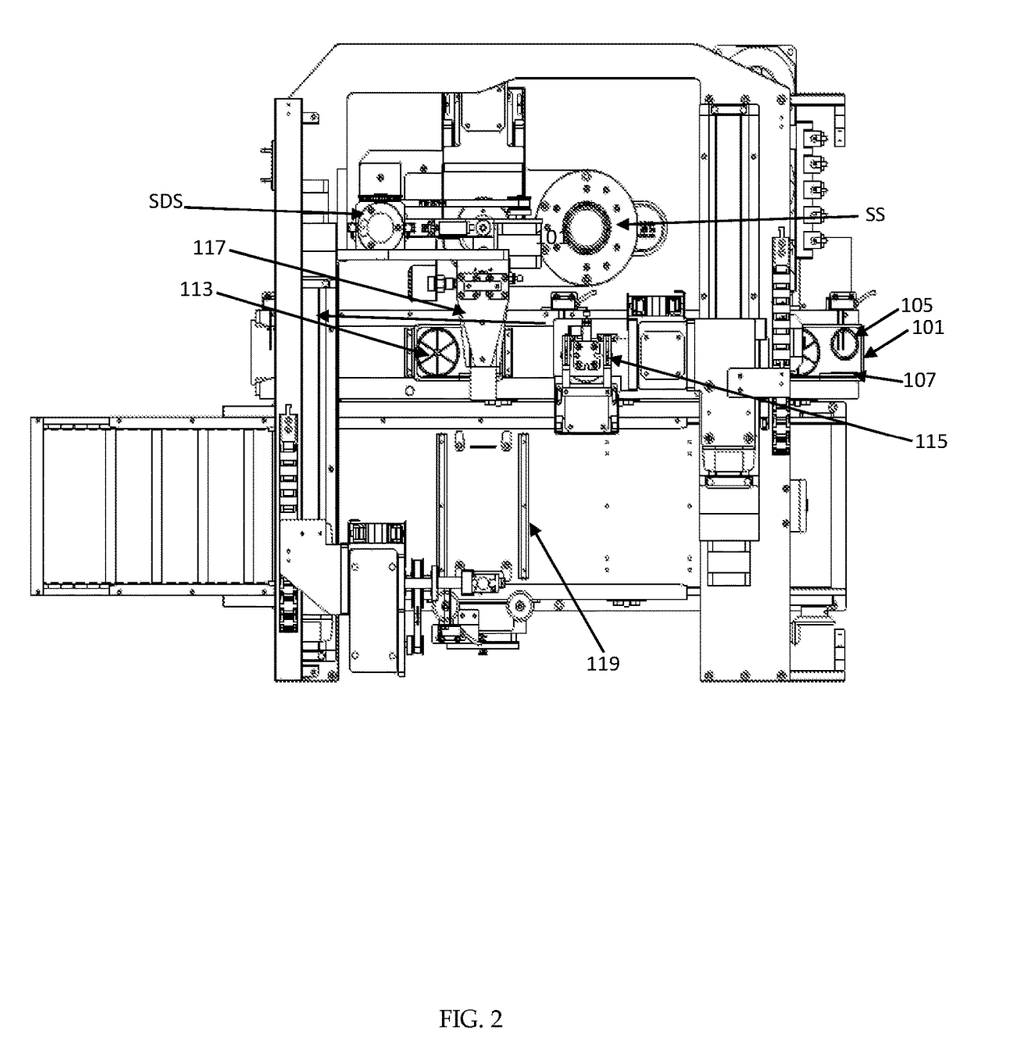
FIG. 2 shows an exemplary top view of the working station.
Figure 3:
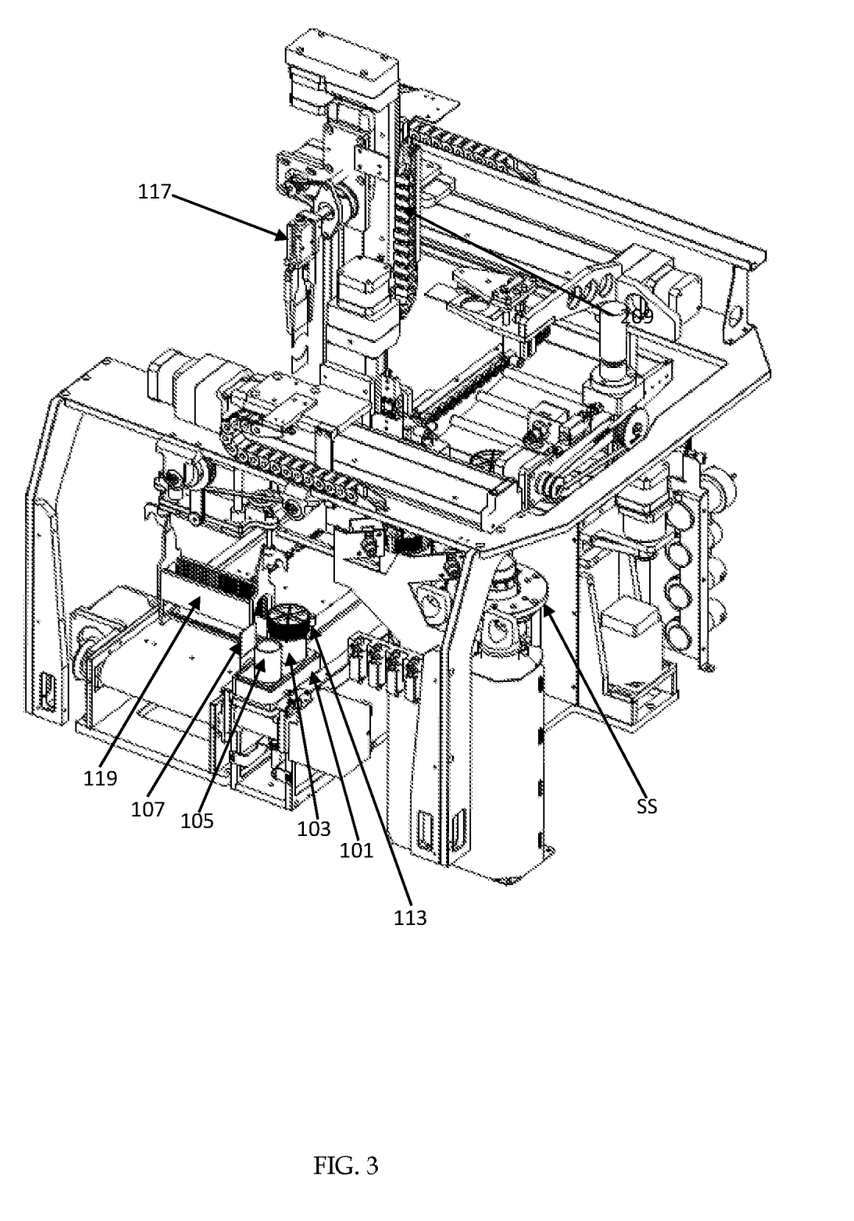
FIG. 3 shows an exemplary side view of the working station.

Referring now to FIG. 2 and FIG. 3, there are shown an exemplary top view and side view of the working station (WS). The substrate (101) is conveyed from the movable platform (127) of said first station (FS) to said working platform (109) for preparation of the homogenous thin-layer LBC slides continuously. In term of the working mechanism, said working station (WS) is a stand-alone system wherein the inputs such as the substrate (101) can either be conveyed from the vertical rotary conveyor system (121) or manually inserted by the user or operator. The similar condition applied to said vertical rotary conveyor system (121). For instance, in the absence of said working station (WS), said vertical rotary conveyor system (121) can operate with another working module as long as the working module comprises of a platform to connect with said movable platform (127).

Figure 4:
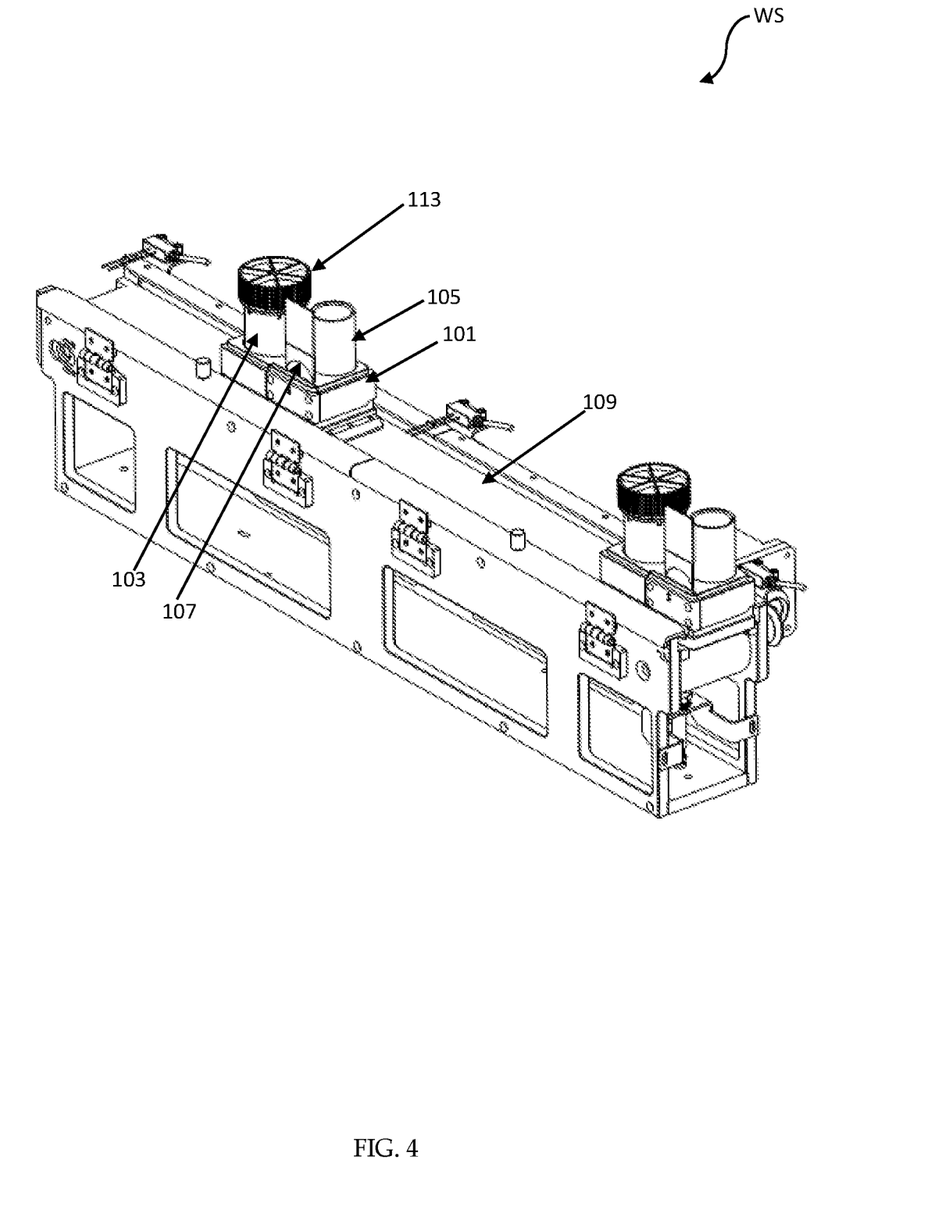
FIG. 4 shows an exemplary enlarged view of the substrate while holding the vials containing specimen, filter and slide on the working platform.

The enlarged view of substrate (101) while holding the vials (103) containing specimen, the filter (105) and the slide (107) on the working platform (109) is illustrated in FIG. 4. Conventionally, said vials (103), filter (105), and slide (107) are carried by different holders which encountered some drawbacks such as mismatch of the samples during slide collection. To overcome the aforesaid limitation, the present invention comprises of said substrate (1) which served as a single entity or single unit for conveying the vials (103), the filter (105), and the slide (107) to avoid any mismatch of said samples due to the disarranged of said vials (103), filter (105), and slide (107).

Figure 5:
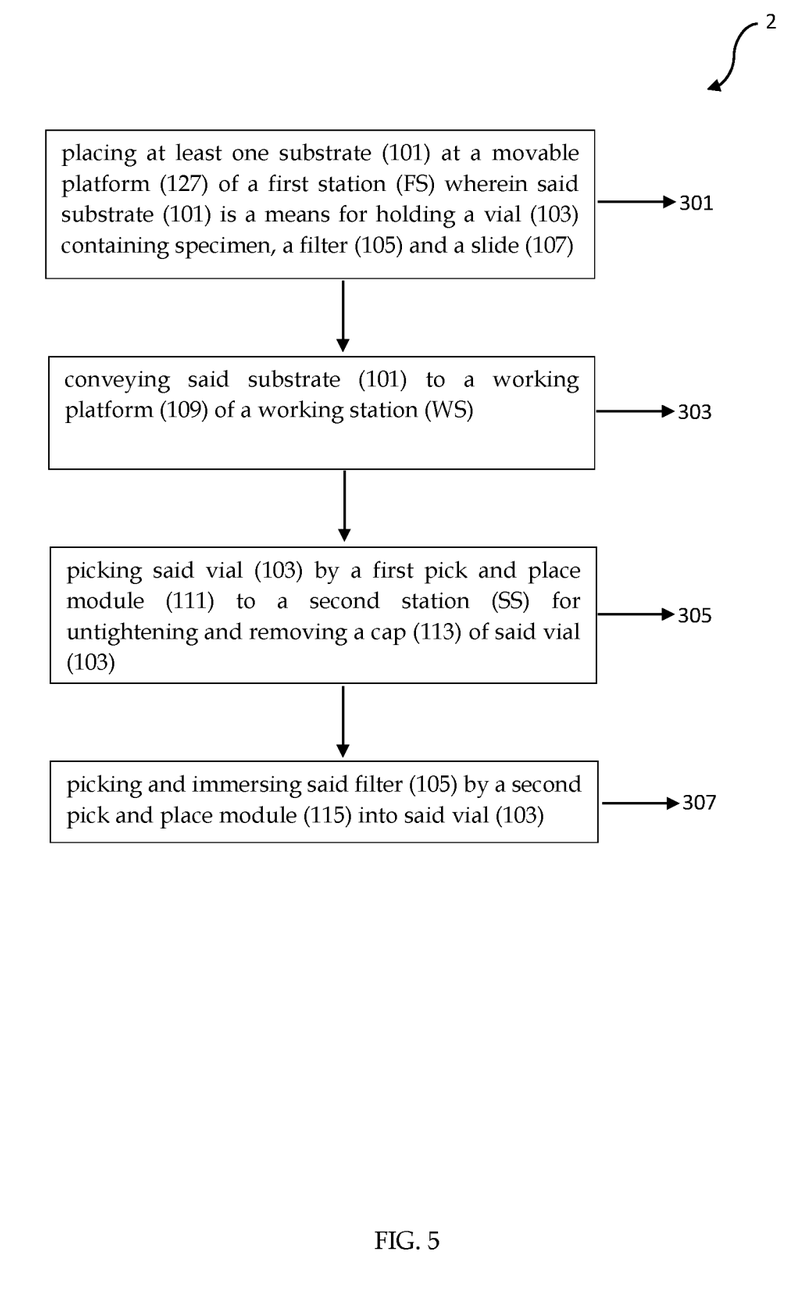
FIG. 5 shows an exemplary method flow of the present invention while preparing liquid-based cytology (LBC) slides by means of filtration.

Referring now to FIG. 5, there is shown an exemplary method (2) for automatically preparing liquid-based cytology (LBC) slides (107) by means of filtration. First and foremost, (i) placing at least one substrate (101) at a movable platform (127) of a first station (FS) wherein said substrate (101) is a means for holding a vial (103) containing specimen at a first position, a filter (105) at a second position and a slide (107) at a third position (301), then (ii) conveying said substrate (101) to a working platform (109) of a working station (WS) (303), wherein said movable platform (127) and working platform (109) include but not limited to conveyor belt, pellets or the like. Said first station (FS) includes a vertical rotary conveyor system (121) which will perform step (ii) conveying said substrate (101) to a working platform (109) of a working station (WS) (303). Said vertical rotary conveyor system (121) is an automated system which enables continuous movement of said substrates in a clockwise or anticlockwise direction.

Next, (iii) picking said vial (103) by a first pick and place module (111) to a second station (SS) for untightening and removing a cap (113) of said vial (103) (305); (iv) picking and immersing said filter (105) by a second pick and place module (115) into said vial (103)(307), wherein said filter (105) is rotated to homogenize the specimen and the specimen cells are collected on the surface of said filter (105) while vacuum is applied. Lastly (v) picking and adhering said slide (107) by a third pick and place module (117) to said filter (105) and transferring said slide (107) to a slide holder (119) afterwards (310).

Said method (2) further comprises of a step of transferring said vial (103) to a first disposable station (FDS) by said first pick and place module (111) (309) after step (iv) picking and immersing said filter (105) by a second pick and place module (115) to said vial (103) (307).

Furthermore, said method (2) also comprises of a step of transferring said filter (105) to a second disposable station (SDS) by said second pick and place module (115) (311) after step (v) picking and adhering said slide (107) by a third pick and place module (117) to said filter (105) and transferring said slide (107) to a slide holder (119) afterwards (310).

What is claimed is:

1. A method (2) for automatically preparing liquid-based cytology (LBC) slides by means of filtration, comprising of the following steps:
    (i) placing at least one substrate (101) at a movable platform (127) of a first station (FS) wherein said substrate (101) is a means for holding a vial (103) containing specimen, a filter (105) and a slide (107) (301);
    (ii) conveying said substrate (101) to a working platform (109) of a working station (WS) (303);
    (iii) picking said vial (103) by a first pick and place module (111) to a second station (SS) for untightening and removing a cap (113) of said vial (103) (305);
    (iv) picking and immersing said filter (105) by a second pick and place module (115) into said vial (103) (307); and
    (v) picking and adhering said slide (107) by a third pick and place module (117) to said filter (105) and transferring said slide (107) to a slide holder (119) afterwards (310);

characterized in that said first station (FS) includes a vertical rotary conveyor system (121) which perform step (ii) conveying said substrate (101) to a working platform (109) of a working station (WS) (303).

2. The method (2) for automatically preparing liquid-based cytology (LBC) slides by means of filtration as claimed in claim 1, wherein said method (2) further comprises of a step of transferring said vial (103) to a first disposable station (FDS) by said first pick and place module (111) (309) after step (iv) picking and immersing said filter (105) by a second pick and place module (115) to said vial (103)(307).

3. The method (2) for automatically preparing liquid-based cytology (LBC) slides by means of filtration as claimed in claim 1, wherein said method (2) further comprises of a step of transferring said filter (105) to a second disposable station (SDS) by said second pick and place module (115) (311) after step (v) picking and adhering said slide (107) by a third pick and place module (117) to said filter (105) and transferring said slide (107) to a slide holder (119) afterwards (310).

4. The method (2) for automatically preparing liquid-based cytology (LBC) slides by means of filtration as claimed in claim 1, wherein said movable platform (127) and working platform (109) includes conveyor belt, pallets or the like.

5. The method (2) for automatically preparing liquid-based cytology (LBC) slides by means of filtration as claimed in claim 1, wherein said vertical rotary conveyor system (121) is an automated system which enables continuous movement of said substrates in a clockwise or anticlockwise direction.

* * * * *